United States Patent [19]
Dechavanne

[11] 3,990,712
[45] Nov. 9, 1976

[54] DOUBLE-ACTION COMPRESSION TYPE SEAL

[76] Inventor: Jacques Dechavanne, 3, Boulevard de Jomardiere, Saint Egreve, Isere, France

[22] Filed: Dec. 19, 1974

[21] Appl. No.: 534,165

[30] Foreign Application Priority Data
Dec. 19, 1973  France .................................. 73.4556

[52] U.S. Cl. ............................ 277/165; 277/188 A; 277/195; 277/198
[51] Int. Cl.² ........................ F16J 9/06; F02F 5/00
[58] Field of Search ........... 277/188, 198, 193, 195, 277/165, 227, 115

[56] References Cited
UNITED STATES PATENTS

| | | | |
|---|---|---|---|
| 1,529,052 | 3/1925 | Anderson | 277/195 |
| 3,261,613 | 7/1966 | Norick et al. | 277/188 |
| 3,473,814 | 10/1969 | Bastow | 277/188 |
| 3,771,801 | 11/1973 | Burke | 277/165 |

*Primary Examiner*—Richard E. Aegerter
*Assistant Examiner*—L. Footland
*Attorney, Agent, or Firm*—Karl F. Ross; Herbert Dubno

[57] ABSTRACT

A seal mountable between a piston-like element and a cylinder-like element, one of which is formed with a groove opening toward the other, has a supple annular core with an inner periphery and an outer periphery spaced radially therefrom. One of these peripheries lies in the base of the groove and the other periphery is turned radially toward the other element. A central contact ring is compressed radially between the other periphery and the other element and at least one rigid guide sleeve has an end region at least partially surrounding the core and formed with an end face axially engageable with the contact ring. The sleeve lies between the elements. The annular core is elastomeric, the contact ring is formed of readily deformable material having a very low coefficient of friction, and the guide sleeve is formed of a very stiff and durable synthetic resin.

2 Claims, 4 Drawing Figures

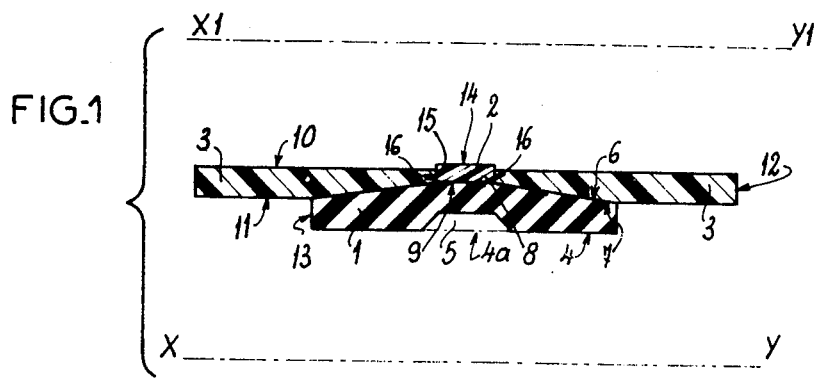
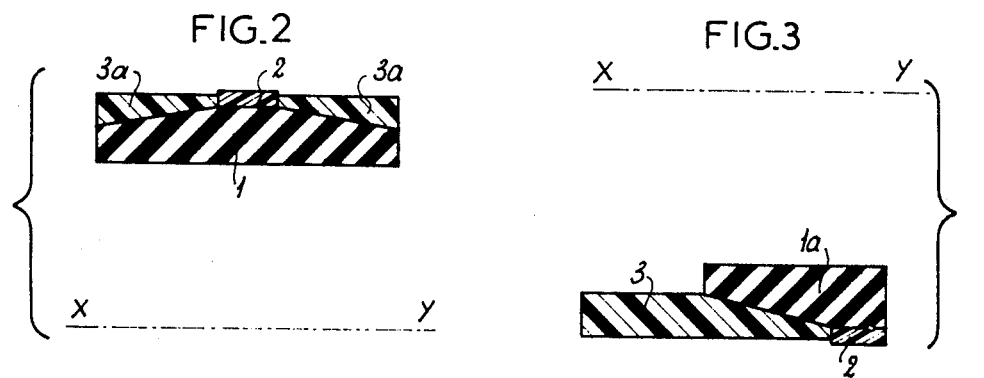
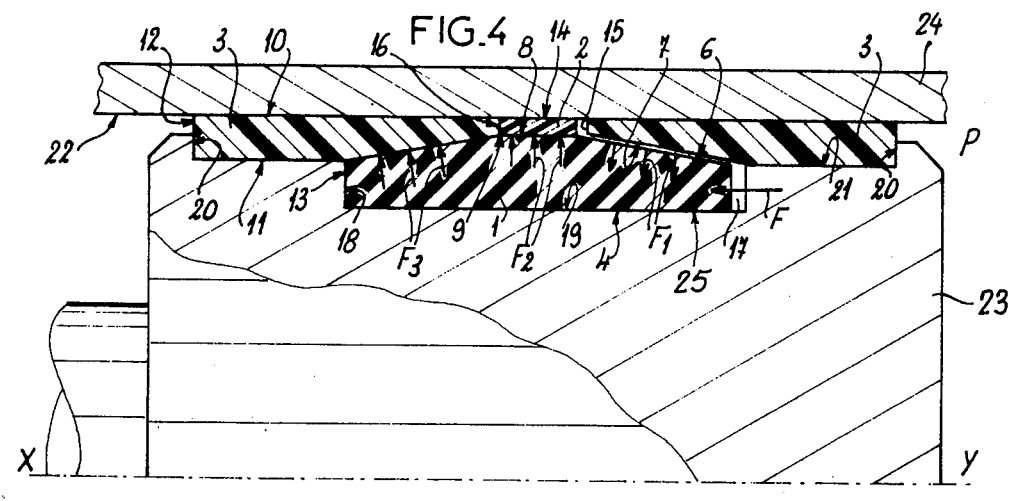

DOUBLE-ACTION COMPRESSION TYPE SEAL

CROSS-REFERENCE TO RELATED APPLICATION

This application is related to my copending patent application Ser. No. 471,909 filed on 21 May 1974 and to my commonly filed patent applications Ser. Nos. 534,275 and 534,164.

FIELD OF THE INVENTION

The present invention relates to a dynamic seal. More particularly this invention concerns a seal which can be used as a double-action seal between a cylinder and a piston or as a single-action seal on a piston rod, shaft, or the like.

BACKGROUND OF THE INVENTION

Three principal types of such seals are known. In the first type an internal or external contact ring is pressed against the surface to be sealed by a biasing member of square or rectangular cross-section and having a width which is substantially smaller than that of the contact ring. It is also known to provide seals having square or rectangular-section lateral guide sleeves flanking a triangular-section core which itself contacts the surface to be sealed without the intermediary of special sleeves. The third type of seal comprises an assembly having a central supple core which bears against the surface to be sealed and is maintained by two guide and protecting sleeves each having a nose or end whose inner face comes in contact with one of the inclined flanks of the central filler.

A principal disadvantage of such seals is that they are tight even when the pressure differential across them is relatively slight. This can lead to the so-called dieseling effect wherein the air oil-vapor mixture spontaneously explodes, thereby destroying the seal rapidly.

OBJECTS OF THE INVENTION

It is therefore an object of the present invention to provide an improved seal.

Yet another object is the provision of such a seal which can be used both as a single-action or double-action seal.

A further object is the provision of a compression seal wherein the sealing force is generally proportional to the pressure differential across the seal.

SUMMARY OF THE INVENTION

These objects are attained according to the present invention in a seal comprising a central supple pressure-distributing core which presses a central contact ring against a surface to be sealed, and at least one guide and protection collar whose end is engageable with one of the end surfaces of the contact ring.

The use of this contact ring, which is made of a material such as polytetrafluorethylene which deforms and adapts itself readily to any change in shape of the cylinder or piston, makes the seal particularly advantageous in systems where high relative velocities between the two sealed elements are likely to be encountered. The elastomeric core ring urges the contact ring against the surface to be sealed at all times so that this system even functions adequately with a zero pressure differential across it.

In accordance with yet another feature of this invention the supple core ring is formed on its periphery opposite that which presses against the contact ring with an annular groove allowing it to be used at very low pressures with maximum efficiency. It is also possible thereby to decrease the force necessary for emplacing or mounting the contact ring.

According to yet another feature of this invention the supple core has an axial length substantially greater than that of the contact ring. Furthermore the guide collar or collars are tapered toward their end faces engaging the contact ring.

BRIEF DESCRIPTION OF THE DRAWING

The above and other objects, features, and advantages will become more readily apparent from the following, reference being made to the accompanying drawing in which:

FIG. 1 is a cross section through a seal in accordance with the present invention;

FIGS. 2 and 3 are cross sections through further arrangements in accordance with this invention; and FIG. 4 is an axial section through the seal of FIG. 1, shown mounted in place on a piston in a cylinder.

SPECIFIC DESCRIPTION

As shown in FIGS. 1 and 4 a seal according to the present invention comprises a polytetrafluorethylene or polyethylene ring 2 of rectangular section which has a cylindrical face 9 lying against a cylindrical outer face 8 of an elastomeric core ring 1. This contact ring 2 further has planar end faces 16 which are braced against similar end faces 15 of like guide collars 3. The entire assembly is adapted to be mounted either in a groove formed in a piston or in a groove formed in a cylinder. In the case of a piston it is annular and centered on an axis x-y and when mounted on a cylinder it is centered on an axis x1-y1.

The cylindrical periphery 14 of the ring 2 lies against the surface to be sealed. The core body 1 is elastomeric and, when the seal is to be used in low-pressure systems, is formed with an annular notch 5 opposite the ring 2, but when used in high-pressure systems the inner face 4 of the body 1 is cylindrical as shown by dot-dash line 4a.

The collars 3 are made of acetal resin so as to be substantially stiffer than both the contact ring 2 and the elastomeric body 1. The one periphery 10 of each of the sleeves 3 is adapted to slide along the surface to be sealed whereas the other surface 11 is adapted to lie on the moving body.

When mounted in a piston 23 as shown in FIG. 4 the inner peripheries 11 of the collars 3 lie against grooves or shoulders 21 of the piston and outer end faces 12 of these sleeves 3 press against inwardly directed end faces 20 of the groove 21 formed in the piston 23. Formed within this groove 21 is yet another groove 25 having a cylindrical base surface 19 and a pair of parallel and planar end surfaces 18. The elastomeric core 1 fits within this groove 25 lying on the base 19 and having its end face 13 pressing against that end 18 of the groove toward the low-pressure side of the piston 23. The surfaces 10 and 14 are all in line and lie against a smooth inner surface 22 of the cylinder 24. The inner peripheries of the sleeves 3 are tapered and have frustoconical inner surfaces 7 so as to lie on corresponding frustoconical surfaces 6 of the body 1 which extend from the cylindrical surface 8 to the end surfaces 13.

Thus in use when the assembly of FIG. 4 is exposed to a pressure P at the face of the piston 23 the body 1 is displaced back by a corresponding force F that forms a gap 17 at the front side of the body 1, and the Teflon ring 2 is simultaneously pushed against the back surface 15. The force F is effective as shown by arrows F1 to press the body 1 tightly down against the base 19 of the groove. Since the back side of this body 1 is confined, this force F1 is transformed into a force F2 pressing the ring 2 up against the surface 22 and force F3 pressing the body 1 against the surface 7 of the back sleeve 3.

The joint is assembled by first slipping the elastomeric ring 1 over the chamfered end of the piston 23 and fitting it into its groove 27. Then the contact ring 2 is fitted in place, this operation requiring no deformation at all of this ring 2, and then the two acetal rings 3 are fitted over their respective chamfered ends of the pistons and snapped in place in the grooves 21. This limited deformation of these rings 3 damages them in no way. The diameter of the sleeves 3 at the wide side of their surfaces 7 is greater than the diameter of the piston so as to facilitate this mounting operation.

Should the guide 3 wear, a slight play between the interior diameter of the shoulder 11 and the interior cylindrical surface 21 of the sleeve 3 will appear. Theoretically this could create the danger of extrusion between these two elements, however since they are static one relative to the other the danger is minimal especially since the length of the extensions 6 of the core ring 1 allow regeneration in case of slight destruction. Effectively, if a mobile element could be mounted with no play in a cylinder it would be possible to have a perfect seal without any need of a seal as described here. This principle has been embodied in the present invention because the extrusion gap which could be created between the surfaces 10 and 22 is constantly maintained at zero, and as the pressure increases the force with which the sleeve presses against the surface 22 is increased.

FIG. 2 shows an arrangement wherein the double-action seal is formed with relatively short guide sleeves 3a of trapezoidal section, that is of rectangular section with frustoconical inner surfaces. Such an arrangement can readily be mounted in a single rectangular groove in a cylinder or piston.

The arrangement shown in FIG. 3 is a single-action seal adapted to be secured within a stepped groove. In this arrangement a single sleeve 3 is used and a shortened elastomeric core body 1a is also employed, with its one end face coinciding with the corresponding end face of the ring 2.

The seal according to the present invention can be used in all kinds of single- or double-action hydraulic cylinders and is effective both at very high and very low pressure differentials. It is further possible to provide such a seal surrounding the piston rod in a double- or single-action cylinder and in the pistons of pressure accumulators.

I claim:
1. The combination of:
   a cylindrical piston formed with an outwardly opening groove having a base, a pair of flanks extending radially outwardly from said base, and cylindrical surfaces adjacent said flanks;
   a cylinder spacedly surrounding said piston; and
   a seal between said piston and said cylinder, said seal comprising:
      a supple annular core in said groove between said flanks, said core having an inner periphery lying against said base and an outer periphery turned toward but spaced from said cylinder, said core having an axial end engageable directly against one of said flanks of said groove,
      a central contact ring compressed radially between said outer periphery of said core and said cylinder and having a radial thickness, said core having an axial length substantially greater than the axial length of said contact ring, said contact ring having an inner diameter at least as great as the outer diameter of said piston whereby said contact ring can be slipped axially over said piston without deformation, and
      a pair of rigid guide sleeves each having:
         an end face axially engageble directly with said contact ring and having a radial height at said face at most equal to said thickness
         an outer annular surface slidable against said cylinder, and
         an inner annular surface subdivided at a respective one of said flanks into a frustoconical section lying directly on said core and a cylindrical section directly adjoining said frustoconical section and lying directly on a respective one of said cylindrical surfaces of said piston.
2. The combination defined in claim 1 wherein said ring is composed of polytetrafluoroethylene.

* * * * *